Dec. 25, 1923.  
E. W. BELLUCHE  
SHEET FEEDER  
Filed July 28, 1920

Inventor  
Elmer W. Belluche  
By his Attorney  
Philip C. Peck

Dec. 25, 1923.

E. W. BELLUCHE

SHEET FEEDER

Filed July 28, 1920    6 Sheets-Sheet 3

1,478,374

Dec. 25, 1923.  
E. W. BELLUCHE  
SHEET FEEDER  
Filed July 28, 1920  
1,478,374  
6 Sheets-Sheet 4

Inventor  
Elmer W. Belluche  
By his Attorney

Dec. 25, 1923.　　　　　　　　　　　　　　　　1,478,374
E. W. BELLUCHE
SHEET FEEDER
Filed July 28, 1920　　6 Sheets-Sheet 6

Inventor
Elmer W. Belluche
By his Attorney
Philip C. Kek

Patented Dec. 25, 1923.

1,478,374

UNITED STATES PATENT OFFICE.

ELMER W. BELLUCHE, OF WATERTOWN, MASSACHUSETTS, ASSIGNOR TO GEORGE R. SWART & COMPANY, INC., OF NEW YORK, N. Y., A CORPORATION OF NEW YORK.

SHEET FEEDER.

Application filed July 28, 1920. Serial No. 399,576.

*To all whom it may concern:*

Be it known that I, ELMER W. BELLUCHE, a citizen of the United States, and a resident of Watertown, in the county of Middlesex and State of Massachusetts, have invented certain new and useful Improvements in Sheet Feeders, of which the following is a specification, reference being made to the accompanying drawings, forming a part thereof.

By invention relates to machines for feeding separate sheets to a printing press or other like machine, and I have embodied the features of my improvements in a sheet feeder of the type known as "continuous feeders" in which a bank or pile or feathered or fanned out sheets of paper is placed upon an upper supply table and from there carried about a feeding drum located at the end of the feeder to a feed board where the leading ends of the sheets are acted on by mechanisms for further separating and advancing the individual sheets to a conveyor mechanism which carries such sheets, one by one, to the printing press or other machine.

The objects of my invention are, among other things, to embody in a feeder of this class certain novel features in the mechanisms employed for separating and conveying the individual sheets whereby the construction and operation are simplified and made more effective, and also in the devices for removing the conveyor or parts off the feed-board after the main head of the feeder has been retracted thereon so as to afford a maximum amount of space on the feedboard when it is desired to use the feedboard of the press for feeding the separate sheets by hand.

A further object of my invention is to provide an improved mechanism for moving this main head of the feeder along with the conveyor mechanism backward and forward in conjunction with the lifting and lowering of the supply table whereby the use of separate sections for conveying the separate sheets on the feed-board may be dispensed with.

A further object is to embody in my feeder an improved mechanism for actuating the combing rolls which are used to comb out and separate the upper sheets from the bank of the sheets lying on the feed-board while advancing the top sheet to the conveyors which carry the sheets successively to the press. By my improved devices I am able to put pressure on the combing rolls when lowered to the bank of sheets to comb to accommodate for banks of varying thickness and of different qualities in the paper stock; and also when the combing rolls are raised above the bank the same devices likewise serve to quicken the lifting action of such combing rolls and in maintaining same in elevated position while acting to reset the latching devices controlled by the trip, and also to lift the trip out of the path of the advancing sheet.

A further object is to provide a novel form of gripper conveyor mechanism which will seize the separate sheets at a state of rest and then advance them forwardly at an accelerated speed which is thereafter retarded to a slow uniform speed as the sheet is brought to registering position to be drawn into the press, the path of the grippers being somewhat raised above the feedboard to allow air films between the sheet and feed-board to float the sheet forwardly to the press over the feed-board.

With the above and other objects in view, my invention comprises the novel construction, combination and arrangement of parts to be hereinafter specifically described and thereafter particularly pointed out in the appended claims.

I attain the foregoing advantageous results by the sheet-feeder shown in the accompanying drawings in which—

Figures 4 and 5 are detail views of the center grippers while

Figure 8 is a diagrammatic lay-out of the gears for operating the gripper-carriages and combing rolls;

Figure 9 is a sectional detail view showing means for operating the rack attached to the gripper carriage;

Figure 10 is an enlarged sectional view showing gear and cam mechanism for operating the parallel bars, raising and lowering mechanism for the combing rolls and also the resetting cams;

Figure 11 is a face view showing the parts illustrated in Figure 10 in elevation;

Similar numerals refer to similar parts throughout the several figures.

Figures 1, 6, 7:
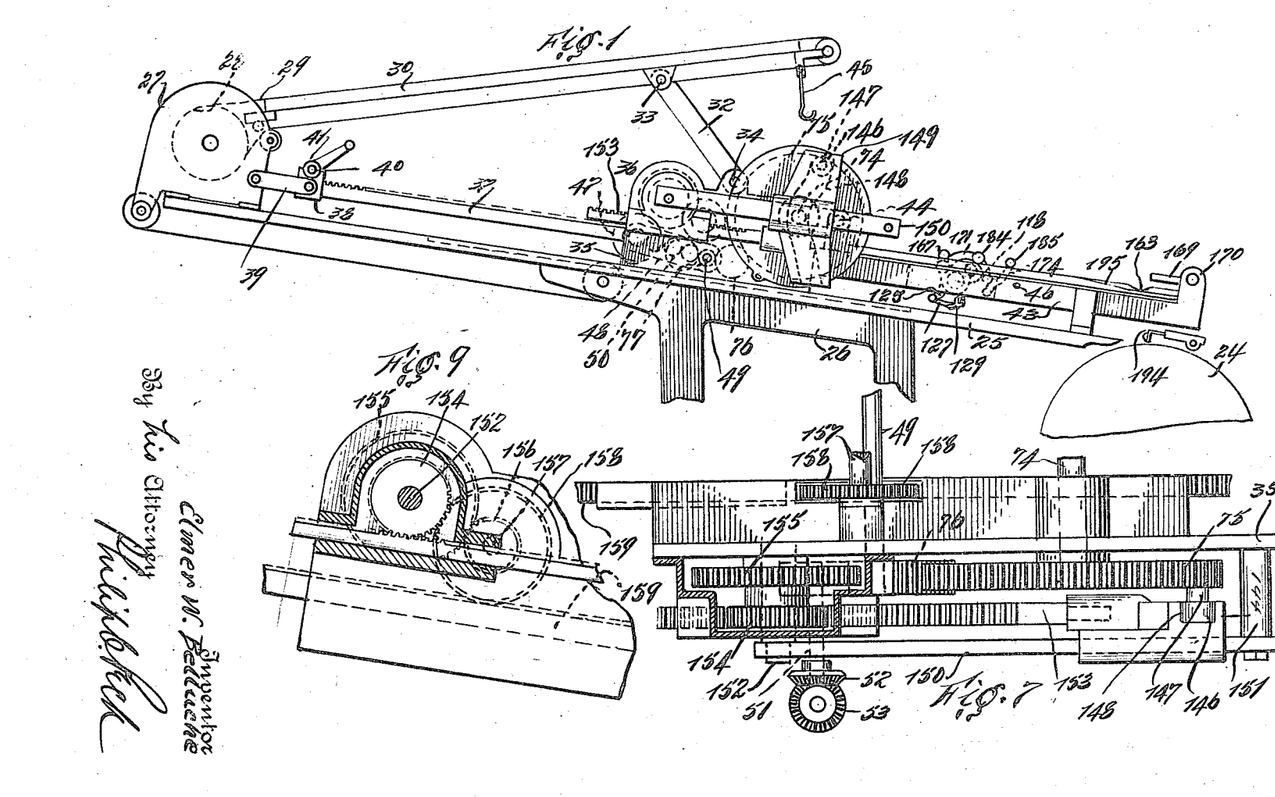
Figure 1 is a diagrammatic side elevation view of the feeder embodying my improvements.
Figure 6 is a detail view of one of the end grippers.
Figure 7 is an enlarged fragmentary plan view of the mechanism to reciprocate the gripper carriages and also to operate the combing rolls.
Figures 2, 18, 19, 21:
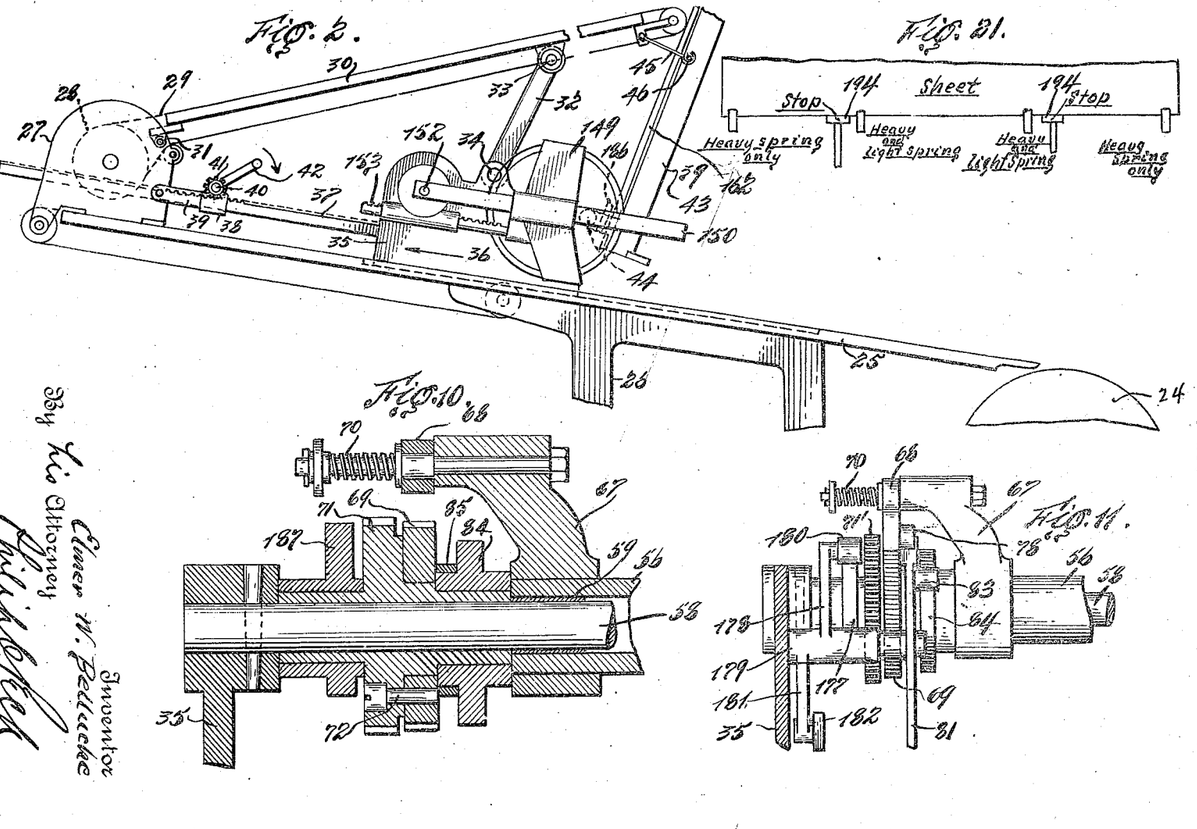
Figure 2 is a view similar to Figure 1 with the main head drawn back and the conveyor frames raised.
Figures 15 to 20 inclusive are diagrammatic views showing the operation of various cams employed in the combing and resetting devices.
Figure 21 is a diagrammatic view showing the grippers and front stops for the sheets.

Referring more particularly to Figures 1 and 2, 24 designates the cylinder of a printing press or other machine and 25 is the feed-board mounted on the usual standards 26, the feed-board 25 serving to support the pile of sheets when the press is fed by hand. At the rear end of the feed-board is the drum head 27 which carries the feeding drum 28 around which the bank of fanned out sheets is transferred by the tapes 29 passing over the upper surface of the supply table 30 upon which the bank of sheets is placed by the operator. The rear end of the supply table 30 is pivoted at 31 to the drum head 27 while the forward end is supported by a pair of swinging arms 32 (only one being shown) pivoted at 33 to the table 30 and at 34 to the side frames 35 of the main head 36 which rests on the feed-board 25 and is longitudinally slidable thereon, such head carrying the separating and feeding mechanisms to be hereinafter described.

To the rear end of the side frames 35 of the head 36 I attach the rack-bars 37 (only one being shown), these racks being similarly constructed and extending rearwardly in substantial parallelism above the feed-board 25. The rack ends pass through hollow blocks 38 carried by brackets 39 fastened to the drum head 27 and the cross shaft 40 journalled in the blocks 38 carries the gears 41 which enmesh with the teeth of racks 37 as shown in Figure 2. The shaft 40 may be rotated in either direction by the crank-handle 42 to advance or withdraw the main head 36 sliding on the feed-board 25. When the head 36 is retracted by turning the crank 42 in the direction of the arrow shown in Figure 2, the arms 32 are swung into their backward position, the supply table 30 being lifted and lowered as the arms 32 pass over the center above the head 36; then the sheet conveyor frames 43 pivoted at 44 to the main head 36 are swung upwardly and held in elevated position by the hook 45 carried by the supply table 30 engaging with a conveniently located pin 46 on the conveyor frame 43. Such arrangement, it will be observed, enables the forward end of the feed-board 25 to be free and clear from the sheet-advancing devices and ready for feeding the sheets by hand to the press.

On the other hand the conveyor frames 43 may be readily unfastened and lowered on the feed-board 25 and the head 36 advanced by the rack and gear mechanism just described, so as to present the feeding mechanism in proper position to the drop guides of the press as shown in Figure 1.

It will be seen that I have provided a simple and effective mechanism for advancing or withdrawing the main head of my feeder by turning a crank-handle in the proper direction while permitting the conveyor frames to be held in a raised position to give free access to the feedboard for hand-feeding, such main head sliding easily over the top surface of the feed-board 25.

The mechanism for separating the individual sheets from the bank consists of two combing rolls each of which acts to forward one side of the top sheet until such roll is lifted when the front edge of the sheet acts on the trip to inaugurate the action of the throw-out devices for such combing roll. Each combing roll is actuated and controlled by independent sets of actuating mechanisms, and since these sets are duplicates of each other in structure and action, I have only shown one set and a description of such set will suffice to explain the nature of my improvements in connection with such combing rolls.

Figure 3:
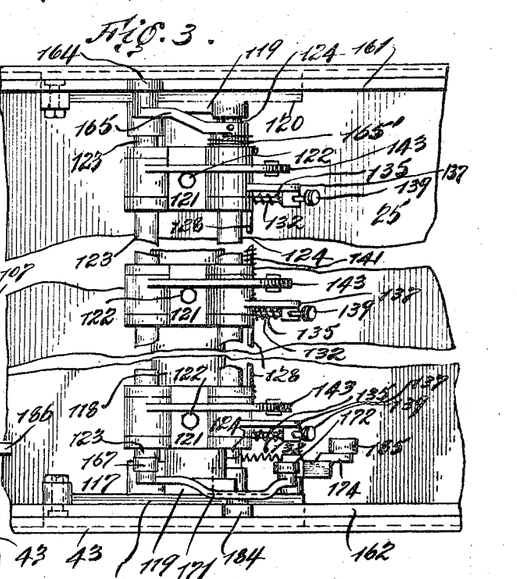
Figure 3 is a diagrammatic plan view of parts of the feeder broken away.
Figures 15, 16, 17, 19, 20, 21:
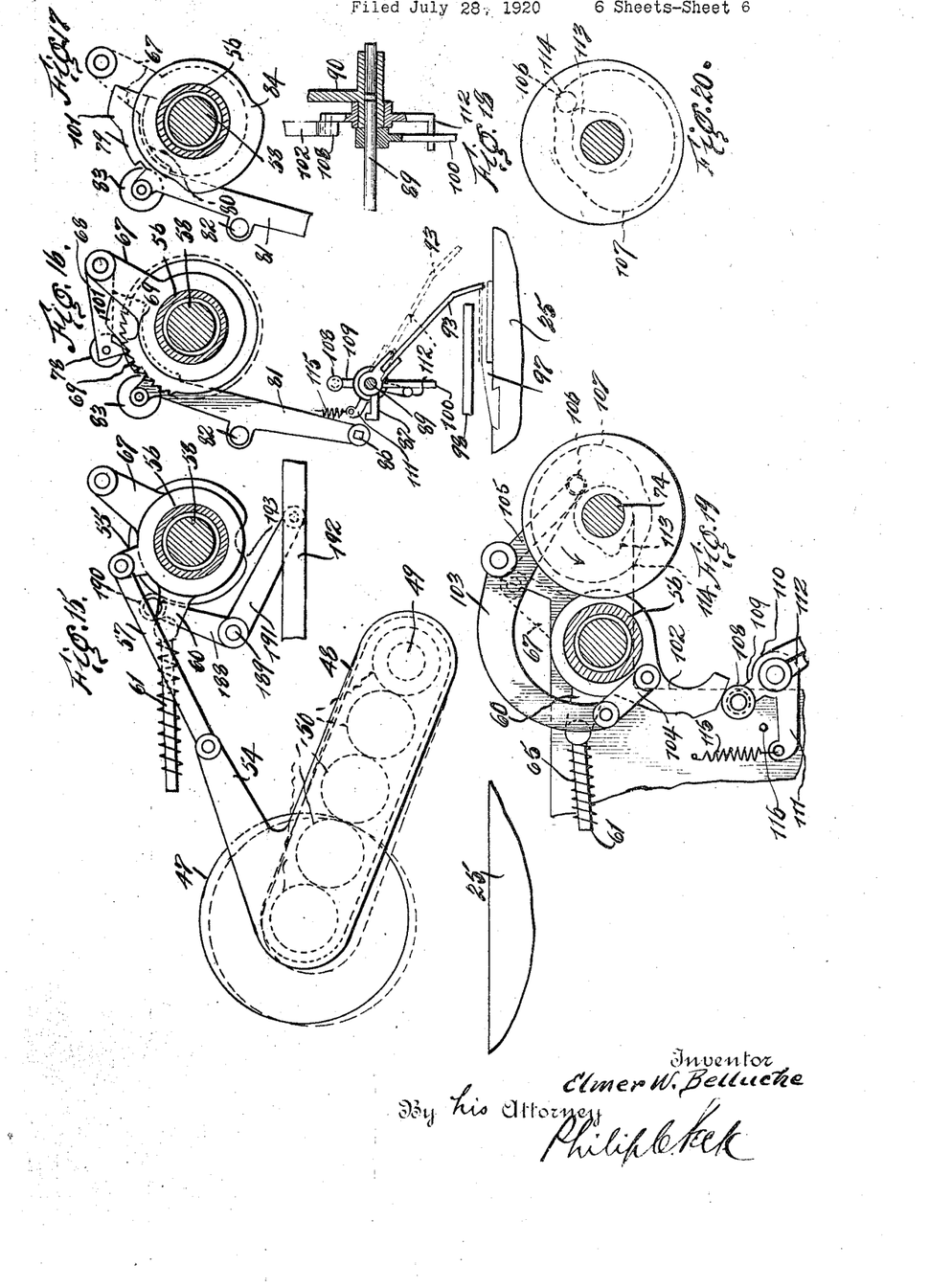
Figure 22:
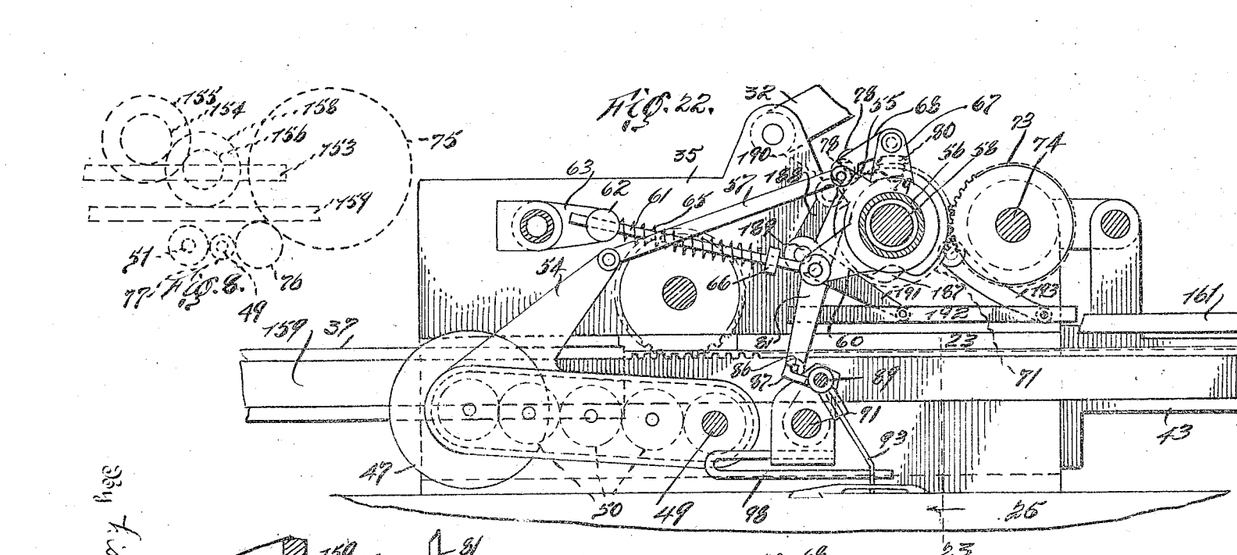
Figure 22 is an enlarged detail sectional view showing the assembly of parts in the main head of the feeder, the head being slidable on the feed-board.

Referring more particularly to Figures 1, 15 and 22, the combing roll 47 is carried by the arm 48 loosely mounted on a continuously-rotating shaft 49 to which the combing roll 47 is operatively connected by a train of gears 50 so that such combing roll 47 may be continuously rotated. The shaft 49 is rotated from the power shaft 51 which is actuated from a suitable source of power, for example, from the press through the bevel gears 52 and 53 shown in Figure 7. The upper side of the arm 48 carries the arm 54 connected to the arm 55 secured to the rock-sleeve 56 by the link 57. The rock-sleeve 56 encircles the tie shaft 58 extending across the machine and is secured to the side frames 35 of the main head 36 as shown in Figures 3 and 10. The ends of the rock-sleeve 56 are supported on the shaft 58 by the bushings 59, only one being shown in Figure 10. Secured to the rock sleeve 56 is the toggle arm 60 pivoted to the other toggle arm 61, the outer end of which arm 61 loosely passes through the hollow block 62 formed in the end of the stationary bracket 63 hung on the shaft 64 secured to the side frame 35. Encircling the arm 61 is the coil spring 65 held under compression between the block 62 by the adjustable screw block 66 on the arm 61 as shown in Figure 22.

Motion is imparted to the rock-sleeve 56 to raise and lower the combing roll 47 through the arms 54 and 55 and link 57 by the action of the toggle arms 60 and 61 passing over the center from the upper position shown in Figure 22 when the combing roll is lowered on the bank of sheets to the lower position shown in Figure 15 when the combing roll 47 is raised, by the following mechanism which is shown in part in Figures 10, 11, 15, 16, 17 and 22. Referring to Figures 10 and 11, the end of the rock-sleeve 56 has the rock arm 67 mounted thereon and this arm 67 carries the pawl 68 which is constantly being forced into its lowered engaging position with the continuously rotating ratchet 69 by the coil spring 70 but is held therefrom by devices hereinafter to be described. It will, of course, be understood that such devices are duplicated on the other side of the machine. The ratchet 69 is secured to the gear 71 journalled on the shaft 58 by the pin 72, and is rotated through the gear 73 secured to the constantly rotating cam shaft 74 (shown in Figure 3). Motion is imparted to the shaft 74 by the cam gear 75, idler gear 76 and pinion 77 secured to the combing roll shaft 49 as shown in Figures 1, 7 and 8.

Figure 23:
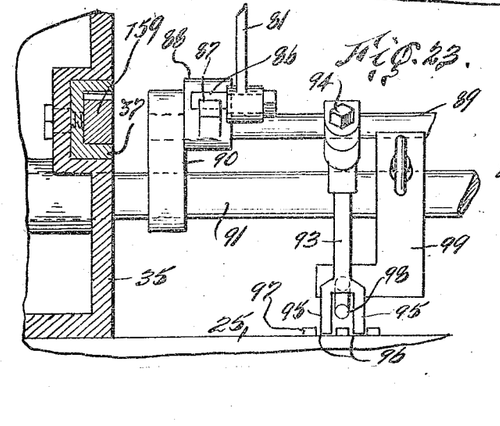
Figure 23 is a detail fragmentary view showing the trip taken on the line 23—23 of Figure 22 but on the opposite side of the feeder.
Figure 24:
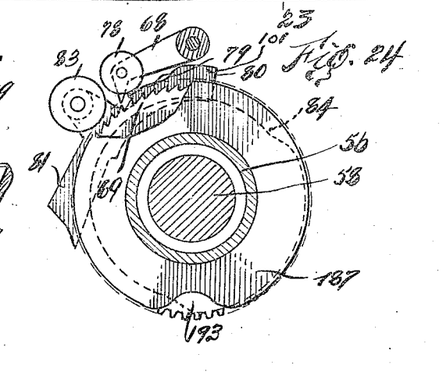
Figure 24 is an enlarged sectional end view of the cam mechanism shown more particularly in Figure 11.

Referring to Figures 16, 17, 22 and 23, the outer end of the pawl 68 carries the roller 78 at one side, such roller being adapted to be engaged by cam face 79 of the upper curved end 80 of the latch lever 81 pivoted at 82 to hold the pawl 68 out of engagement with its ratchet 69 as shown in Figure 24 when the combing roll 47 is lowered on the bank as shown in Figure 22. The upper end 80 carries the cam roller 83 which is engaged by the cam 84 secured to the gear 71 (see Fig. 10), this cam 84 being suitably timed to raise the cam face 79 to keep the pawl 68 out of engagement with the ratchet 69 while the toggle arms are being broken over center to lower the combing roll. The roll 85 located between the ratchet 69 and cam 84 prevents the latch lever from contacting with the rotating cam 84. At its lower end the latch lever 81 carries the latch block 86 which is designed to engage with the latch 87 mounted on the collar 88 secured to the oscillating shaft 89 journalled in the bracket 90 mounted on the tie rod 91 secured to the side frames 35 as shown in Figure 23. The shaft 89 has the trip finger 93 adjustably secured thereon by the nut 94, the lower end of the finger 93 being preferably fork-shaped with the ends 95 passing between suitable longitudinal slots 96 formed in the tongues 97 secured to the feed-board 25 and slightly elevated above the plane of the feed-board; the top rod 98 is arranged above the tongues 97 such rod being attached to the bracket 99 adjustably secured to the rod 91, as shown in Figure 22, and serving to guide the leading edges of the advancing sheets against the trip finger 93. In Figure 22 I have shown the latch 87 in engagement with the latch block 86 and the combing roll lowered with the rollers 78 riding on middle portion of the cam face 79 and the pawl 68 held out of engagement with the ratchet 69; in Figures 15, 16 and 24, I have illustrated the latch engagement as broken by the sheet (shown in dotted lines in Figure 16) striking the finger 93 and lowering the latch 87 out of engagement with the latch block 86, the pawl 68 causing latch lever 81 to swing to carry cam face 79 to the right and from under the pawl roller 78 which is lowered whereby the pawl 68 is pressed downwardly by the spring 70. The pawl 68 at once engages with the teeth of the ratchet 69 which is continuously rotated as hereinbefore described in a clockwise direction. This ratchet and pawl engagement shifts the rock-sleeve 56 to the right thereby causing the toggle arms 60 and 61 to be raised and broken over center from the position shown in Figure 22 to that shown in Figure 15, the spring 65 accelerating the raising of the combing roll 47 and the pawl 68 is thereupon disengaged and lifted from the ratchet 69 by the roller 78 riding up on the high part 101 of the cam face 79 of the latch lever 81.

The mechanism for lifting the trip-finger 93 and resetting the latch after the top sheet has been advanced beyond the zone of the trip finger 93 and the combing roll is lifted is shown in part in Figures 15, 18, 19, 20 and 22, and comprises the cam arm 102 mounted on the rock-sleeve 56, the arm 102 being oscillated by the rock lever 103 connected to the arm 102 by the link 104. The other end 105 of the rock lever 103 carries the cam roller 106 which engages with the constantly rotating cam 107 mounted on the cam shaft 74. When the roller 106 is in contact with the dwell of the cam 107 as shown in Figure 19, the cam arm 102 presses on the roller 108 carried by the arm 109 mounted on the collar 110 which carries the spring arm 111. The depending arm 112 passes below and to the left of the trip bar 100 as shown in Figures 16 and 18, and thereby lifts the trip finger out of range of the passing sheet as shown in dotted lines in Figure 16, the latch 87 being depressed to clear the latch block 86 when the cam 84 forces the upper end 80 of the latch lever 81 to the left (Figs. 16 and 17) thereby carrying the latch block 86 into position for engagement with the latch 87.

When the cam roller 106 passes over the high part 113 formed in the cam 107 this roller 106 is forced against the outer surface 114 of the face cam which swings the rock arm 67 to the left thereby moving the cam arm 102 out of engagement with the roller 108 and the spring 115 raises the arm 109 against the stop 116 which allows the finger 93 to resume its lower position while resetting the latch, and simultaneously causes the pawl roller 78 to ride down on the cam face 79 out of engagement with the ratchet 69. By the foregoing mechanisms the combing roll is accurately controlled in all parts of its cycle while in this cycle of operation for the combing rolls, I have embodied a positive mechanism for resetting the latch while the combing roll is being lowered into engagement of the bank of sheets when the rock sleeve 56 rotates in an anti-clockwise direction by the cam-actuated mechanism shown more particularly in Figures 19 and 20, the breaking of the toggle over center in the intermediate stages of the lowering and raising of the combing rolls serving to quicken the action of the combers while the force of the toggle spring 65 exerts an advantageous pressure on the combing rolls when lowered on the bank, as in Figure 22.

After the sheet has been combed and separated from the bank and passed over the slotted tongues 97 and beyond the trip fingers 93, I have embodied a novel form of gripper conveyor mechanism which seizes the leading edges of the sheets and carries them forwardly against the front stops until taken by the grippers on the cylinder of the press or other like machine. These grippers are carried on a reciprocating carriage over the feed-board 25 and I have preferably arranged two sets of grippers on either side of the feeder, each set comprising a center gripper adapted to seize the middle portion of the sheet while the end gripper grasps the sheet near its side margin as shown in Figure 21. As each set of grippers and their operating mechanisms are duplicates of each other in construction and operation, a description of one set will be sufficient.

Figures 4, 5, 6:
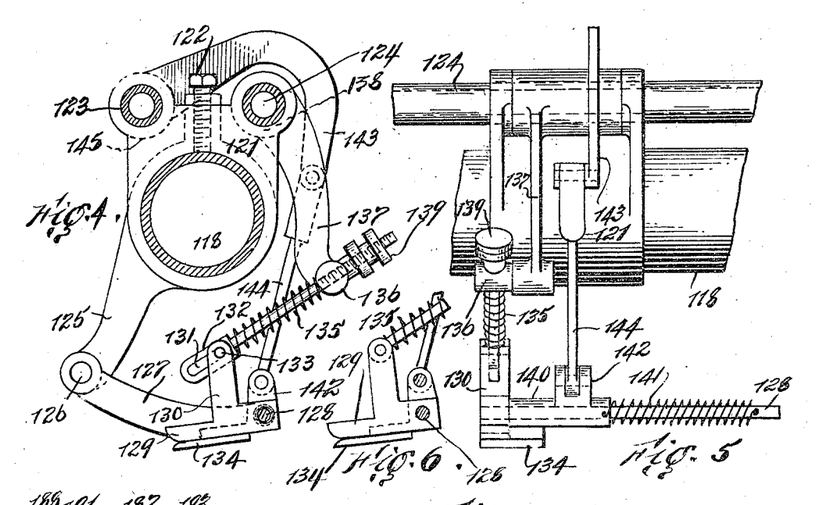

Referring more particularly to Figures 3, 4 and 5, the gripper carriage 117 comprises the tubular shaft 118 secured to the bosses 119 affixed to the brackets 120 which are carried by and slide in the conveyor frames 43, but are moved rearwardly within the head 36 when the conveyor frames 43 are raised as heretofore described. Encircling the tubular shaft 118 are four gripper frames 121 (only three being shown in Figure 3) which are adjustably secured to the shaft 118 by screw-nuts 122 so as to set same properly with reference to the width of the sheet and the drop guides of the press. The rock shafts 123 and 124 are journalled in the brackets 120 to actuate the grippers and operating devices now to be described. Figures 4, 5 and 6 show the gripper construction and the mechanisms to close and open same in suitably timed relation to seize and release the sheet. As shown in Figure 21 the two center grippers have a heavy and light spring structure (also shown in Figs. 4 and 5), while the end grippers have only a heavy spring embodied therein as shown in detail in Figure 6. Referring to Figs. 4 and 5, the frame 121 carries the arm 125 to which is pivoted at 126 the rock-arm 127. On the outer end of the arm 127 is secured the cross shaft 128 to which is pivoted the rearwardly extending upper-gripper jaw 129 in the form of a flat plate, and provided with the upright arm 130 in engagement with the slotted end 131 of the rod 132 by the pin 133 passing through the slot 131 and the ends of the arm 130 as shown in Figures 4 and 5. The lower gripper jaw 134 is in the form of a plate adapted to coact with the upper movable jaw 129, the jaw 134 being secured to the arm 127. The coil spring 135 surrounds the rod 132 between the slotted end 131 and the hollow block 136 journalled on the arm 137 secured to the collar 138 on the shaft 124, the force of the spring being capable of adjustment by the screws 139 carried by the end of the rod 132 projecting through the block 136. Secured to the collar 140 which supports the upper jaw 129 on the shaft 128 is the light torsional spring 141 pinned to the shaft 128, the tension of the spring 141 being not so heavy as that of the spring 135, both springs in the center grippers acting to press the upper gripper jaw 129 on the jaw 134. To lift and lower the grippers the bracket 142 on the arm 127 is connected to the rock arm 143 by the link 144, the arm 143 extending rearwardly over the shaft 124 and is carried by the collar 145 secured about the rock shaft 123 as shown in Figure 3. The end grippers (shown in Figure 6) are constructed in the same manner as the center grippers just described only the light spring 141 is omitted and the rod 132 is pivotally secured to the end of the upright arm 130 without any slotted engagement therewith as is the case with the center grippers.

The gripper carriage 117 is reciprocated on the conveyor frames 43 by the following mechanism: Referring to Figures 1, 3, 7, 8 and 9, the cam gear 75 is rotated in an anti-clockwise direction by idler gear 76, pinion 77 and shaft 49 as heretofore described. The cam gear 75 carries the cam roller 146 mounted on the pin 147 secured to the side of the gear 75 as shown in Figure 7, the roller 146 engaging with a cam slot 148 formed in the Scotch yoke 149 slidably carried by the bar 150 secured to the side frames 35 of the head 36 by the bolt 151 and shaft 152. Secured to the yoke 149 is the reciprocating rack 153 which engages with the gear 154 journalled on the shaft 152; the gear 155 is journalled to the shaft 152 and is compounded with the gear 154, the gear 155 meshing with the gear 156 which is secured to the shaft 157. The gears 158 secured to the shaft 157 enmesh with the sliding racks 159 which are secured to the gripper carriage 117 by the pin 160. By this mechanism in connection with the roller 146 passing through the cam slot 148 as the gear 75 is rotated the carriage 117, when brought to its most rearward position adjacent the trip finger 93, is started from a state of rest in its forward direction at an accelerated speed which is thereafter retarded to a slow uniform speed when the carriage reaches the end of its forward travel with the advanced sheet brought down to the stops arranged over the cylinder 24 of the press.

The two sets of grippers are opened at the beginning of the cycle of movement and lowered close to the trip-finger 93 to seize the sheet which lies on the slotted tongues 97 and raise and convey same forwardly to the press where the grippers are lowered and the outer grippers opened while the center grippers slide off the sheet which has been brought to the stops over the press cylinder 24. A positive means is provided to open the grippers as against the tension of the heavy spring 135 for both sets of grippers, but the jaws of the center grippers are always lightly closed by the light spring 141 as the sheet is registered against the stops, such center grippers sliding over the front margin of the sheets to hold same against the stops without buckling or rebound as might occur should all the grippers release the sheet as soon as latter reached the stops.

Figures 12, 13, 14:
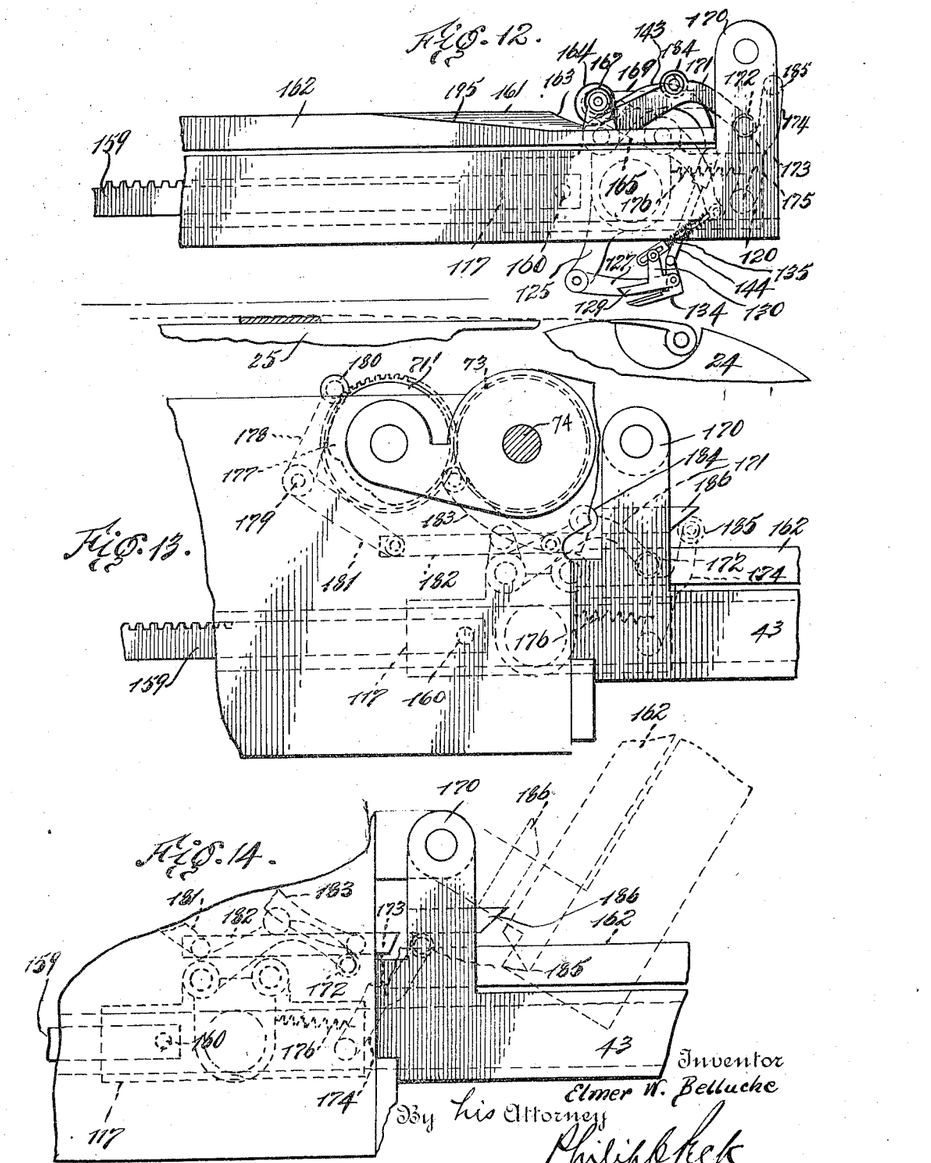
Figures 12, 13 and 14 are diagrammatic views showing the action of the gripper parts in different positions during the cycle of movements.

Referring more particularly to Figures 12, 13, 14 and 15, Figure 12 shows the gripper carriage 117 at the end of its forward movement with the grippers opened and raised above the plane of travel for the sheet. The conveyor frames 43 support two stationary cam bars 161 and 162 arranged upon opposite sides of the feeder, the bar 161 having a depression 163 at its forward end. During the reciprocation of the carriage frame 117 the roller 164 carried on the end of the rock arm 165 secured to the shaft 124 journalled in the brackets 120 rides on the top of the bar 161 through the action of the spring 165'. When the roller 164 falls into the depression 163 toward the end of the forward stroke the arm 137 is moved toward the right which relieves the tension of the heavy spring 135 on the upper jaw, and positively opens the end grippers shown in Fig. 6, but through the slotted end 131 in the rod 132 the heavy spring pressure is only relieved from the center set of grippers the jaws of which remain closed through the tension of the light spring 141. At the end of the forward stroke the roller 167 carried on the end of the rock-arm 168 strikes the projecting pin 169 mounted on the upright bracket 170 attached to the end of the conveyor frame 43 which rocks the arm 168 rearwardly and lifts the rock-arm 143 thereby raising the grippers as shown in Figure 12. The rock-shaft 123 also carries the projecting arm 171 extending forwardly and on the end of the arm 171 is the roller 172 which is adapted to rest in the shoulder 173 formed in the spring arm 174 pivoted at 175 in the brackets 120, the spring 176 always tending to pull the arm 174 to the left; by this latching device the grippers are held in elevated position when the carriage 117 is at the end of the forward stroke by the roller 172 resting on the shoulder 173, and are so maintained during the major portion of the backward stroke when the grippers are retracted to seize and forward the succeeding sheet.

The grippers are depressed from their elevated position and opened to seize the leading edge of the sheet as it lies on the slotted tongues 97 and then closed and raised to carry the sheet forwardly over the feedboard 25 whereby an air film is formed between the sheet and feed-board to float the advancing sheet to the press-cylinder 24 by the following mechanism: Referring to Figures 3, 10, 11, 13, 14 and 15 and particularly to Figures 10, 11, 13 and 15, the gear 71' on the gear side of the machine has secured thereto the cam 177 which constantly rotates with the gear 71' through the mechanism heretofore described. The rock lever 178 is pivoted at 179 on side frame 35 having the cam roller 180 riding on the cam 177. The lower arm 181 of the lever 178 has pivoted thereto the parallel bar 182 which is also supported by the pivoted link 183 as shown in Figures 13 and 14. The arm 171 carries the roller 184 which is adapted to ride on the bar 182 when the gripper carriage 117 is retracted. When the cam roller 180 is moved into the drop of the cam 177 by the weight of the arm 171 and grippers on the bar 182 after the roller 185 on the arm 174 is brought against the cam block 186 mounted on the conveyor frame 43 as shown in Figs. 13 and 14, the roller 172 is disengaged from the shoulder 173 which allows the roller 184 to rest on the bar 182 and the grippers are then lowered so as to seize the combed-out sheet resting on the tongues 97.

Referring to Figures 3, 10, 11, 15, 22 and 24, the cam 187 on the feeder side of the machine (the upper side in Fig. 3) is rotatively connected with the gear 71, and the rock lever 188 pivoted at 189 to the side frame 35 carries the cam roller 190 riding on the cam 187. The lower arm 191 of the lever 188 has pivoted thereto the parallel bar 192 which is also supported by the pivoted link 193 as shown in Figure 22. The roller 164 on the spring-pressed arm 165 rides on the bar 192 when the gripper carriage is retracted. When the cam roller 190 is moved into the drop 193 of the cam 187, the bar 192 is quickly lowered by the spring-pressed arm 165 which opens the jaws of all the grippers, the drop 193 being sufficient not only to take up the length of the slot 131 in the rod 132 but also to open the jaws of the center grippers against the tension of the light spring 141. This opening of the gripper jaws occurs just before the gripper carriage 117 reaches the end of the rearward stroke so as to readily seize the leading edge of the sheet lying on the tongues 97.

After the grippers have seized the sheet, the carriage 117 is advanced and the grippers raised by the lifting of the bar 182 to substantially the level of the stationary cam bar 162 to allow the roller 184 to ride on the top of the bar 162 as the carriage and grippers forward the sheet over the feed-board 25, the elevation of the grippers being preferably such as to allow an air space or film between the conveyed sheet and feed-board. As the sheet is ending its forward movement and its speed is being retarded to a slow uniform rate, it is advantageous to lower the leading edge to make proper contact with the stops or drop guides 194 of the press. To accomplish this I have formed the inclined or cam-shaped track 195 on the bar 162 which track allows the roller 184 to descend and gradually lower the grippers as shown in Figure 12, the path of the sheet being shown in dotted lines. The two sets of grippers (both end and center) aline the sheet against the stops 194 as shown in Figure 21, and the tension of the heavy spring 135 is relieved which positively opens the two end grippers but leaves the jaws of the two center grippers closed through the tension of the light spring 141, the center grippers sliding off the leading edge of the sheet which prevents buckling or rebound as the sheet strikes the stops 194.

It should also be noted that the gripper carriage 117 and gripper operating devices may be retracted within the head 36 by riding on the parallel bars 182 and 192, as shown in Figure 14, leaving the conveyor frames 43 free to be swung upwardly and secured to the upper supply table 30 as shown in Figures 2 and 14.

It will be understood that the sheet-feeder herein shown and described is a preferred embodiment of my invention and that the same may be modified in its various details without departing from the principle and scope of my invention and without sacrificing any of its advantages.

I claim as my invention:

1. In a sheet-feeder, a feed-board, a main head slidably supported on the feed-board, a pivoted supply table superimposed above the feed-board and supported on the main head, and means to advance and withdraw the main head on the feed-board while raising and lowering the supply table over said main head and feed-board.

2. In a sheet-feeder, a feed-board, a main head slidably supported on the feed-board, a pivoted supply table superimposed above the feed-board and supported by swinging arms pivoted on the main head, and means to advance and withdraw the main head on the feed-board while raising and lowering the supply table by said arms over said main head and feed-board.

3. In a sheet-feeder, a feed-board, a main head slidably supported on the feed-board, a pivoted supply table superimposed above the feed-board and supported on the main head, and means comprising a rack and rotatable pinion mechanism arranged between the feed-board and supply table to advance and withdraw the main head on the feed-board while raising and lowering the supply table over said main head and feed-board.

4. In a sheet-feeder, a feed-board, a main head slidably supported on the feed-board, a pivoted supply table superimposed above the feed-board and supported by swinging arms pivoted on the main head, and means comprising a rack and rotatable pinion mechanism arranged between the feed-board and supply table to advance and withdraw the main head on the feed-board while raising and lowering the supply table by said arms over said main head and feed-board.

5. In a sheet-feeder, a feed-board, a main head slidably supported on the feed-board, a pivoted supply table superimposed above the feed-board and supported on the main head, sheet conveyor frames pivotally arranged on the main head and adapted to swing upwardly into engagement with the supply table, and means to advance and withdraw the main head on the feed-board while raising and lowering the supply table and conveyor frames over said main head and feed-board.

6. In a sheet-feeder, a feed-board, a main head slidably supported on the feed-board, a pivoted supply table superimposed above the feed-board and supported by swinging arms pivoted on the main head, sheet conveyor frames pivotally arranged on the main head and adapted to swing upwardly into engagement with the supply table, and means to advance and withdraw the main head on the feed-board while raising and lowering the supply table by said arms and conveyor frames over said main head and feed-board.

7. In a sheet-feeder, a feed-board, a main head slidably supported on the feed-board, a pivoted supply table superimposed above the feed-board and supported on the main head, sheet conveyor frames pivotally arranged on the main head and adapted to swing upwardly into engagement with the supply table, sheet-gripping devices operating in said conveyor frames, but movable within and carried by said main head when said frames are swung upwardly, and means to advance and withdraw the main head on the feed-board while raising and lowering the supply table and conveyor frames over said main head and feed-board.

8. In a sheet-feeder, a feed-board, a main head slidably supported on the feed-board, a pivoted supply table superimposed above the feed-board and supported by swinging arms pivoted on the main head, sheet conveyor frames pivotally arranged on the main head and adapted to swing upwardly into engagement with the supply table, sheet-gripping devices operating in said conveyor frames, but movable within and carried by said main head when said frames are swung upwardly, and means to advance and withdraw the main head on the feed-board while raising and lowering the supply table by said arms and conveyor frames over said main head and feed-board.

9. In a sheet-feeder, a feed-board, a main head upon which the sheet feeding devices are mounted, said head being slidably supported on the feed-board, one or more racks secured to the main head and extending rearwardly over the feed-board, a rotatable shaft journalled over the rear end of the feed-board and gears on the shaft engaging with said racks to advance and withdraw said main head only on the feed-board.

10. In a sheet-feeder, a feed-board, a main head upon which the sheet feeding devices are mounted, said head being slidably supported on the feed-board, a pivoted supply table over the feed-board, a pair of swinging arms pivoted to said supply table and main head, one or more racks secured to the main head and extending rearwardly over the feed-board, a rotatable shaft journalled over the rear end of the feed-board and gears on the shaft engaging with said racks to advance and withdraw said main head on the feed-board while actuating said arms over center over said main head.

11. In a sheet-feeder, a feed-board, a main head slidably supported thereon, a pivoted supply table over said feed-board, means to advance and withdraw said head on said feed-board, sheet conveyor frames pivotally arranged on the main head and supported on said feed-board, said frames being adapted to swing upwardly off the feed-board into engagement with the supply table, sheet gripping devices operating in said conveyor frames but movable within and carried by said main head when said frames are swung upwardly into engagement with said supply table.

12. In a sheet-feeder, a feed-board, a main head slidably supported thereon, a pivoted supply table over said feed-board, means comprising a rack and rotatable pinion mechanism arranged between the feed-board and supply table to advance and withdraw said head on said feed-board, sheet conveyor frames pivotally arranged on the main head and supported on said feed-board, said frames being adapted to swing upwardly off the feed-board into engagement with the supply table, sheet gripping devices operating in said conveyor frames but movable within and carried by said main head when said frames are swung upwardly into engagement with said supply table.

13. In a sheet-feeder, a feed-board, a main head slidably supported on the feed-board, and means to advance and withdraw the main head only on said feed-board.

14. In a sheet-feeder, a feed-board, a main head slidably supported on the feed-board, and means secured to the rear end of the feed-board to advance and withdraw the main head only on said feed-board.

15. In a sheet-feeder, a feed-board, a main head carrying sheet-feeding devices and slidably supported on the feed-board, and means to advance and withdraw the main head only on said feed-board.

16. In a sheet-feeder, a feed-board, a main head carrying sheet-feeding devices and slidably supported on the feed-board, and means secured to the rear end of the feed-board to advance and withdraw the main head only on said feed-board.

17. In a sheet-feeder, a feed-board, a main head slidably supported on the feed-board, sheet conveyor frames pivotally arranged on the main head to swing upwardly, and means to advance and withdraw the main head only on said feed-board.

18. In a sheet-feeder, a feed-board, a main head slidably supported on the feed-board, sheet conveyor frames pivotally arranged on the main head to swing upwardly, and means secured to the rear end of the feed-board to advance and withdraw the main head only on said feed-board.

19. In a sheet-feeder, a feed-board, a main head slidably supported on the feed-board, and means comprising a rack and rotatable pinion mechanism arranged between the rear end of the feed-board and the main head only to advance and withdraw the main head on said feed-board.

20. In a sheet-feeder, a feed-board, a main head slidably supported on the feed-board, and means comprising a rack and rotatable pinion mechanism arranged between, and secured to, the rear end of the feed-board and the main head to advance and withdraw the main head only on said feed-board.

21. In a sheet-feeder, a feed-board, a main head carrying sheet-feeding devices and slidably supported on the feed-board, and means comprising a rack and rotatable pinion mechanism arranged between the rear end of the feed-board and the main head only to advance and withdraw the main head on said feed-board.

22. In a sheet-feeder, a feed-board, a main head carrying sheet-feeding devices and slidably supported on the feed-board, and means comprising a rack and rotatable pinion mechanism arranged between, and secured to, the rear end of the feed-board and the main head to advance and withdraw the main head only on said feed-board.

23. In a sheet-feeder, a feed-board, a main head slidably supported thereon, means to advance and withdraw said head only on said feed-board, sheet-conveyor frames pivotally arranged on the main head to swing upwardly, and sheet-gripping devices operating in said conveyor frames but movable within and carried by said main head when said frames are swung upwardly.

24. In a sheet-feeder, a feed-board, a main head slidably supported thereon, means secured to the rear end of the feed-board to advance and withdraw said head only on said feed-board, sheet-conveyor frames pivotally arranged on the main head to swing upwardly, and sheet-gripping devices operating in said conveyor frames but movable within and carried by said main head when said frames are swung upwardly.

25. In a sheet-feeder, a feed-board, a main head carrying sheet-feeding devices and slidably supported thereon, means secured to the rear end of the feed-board to advance and withdraw said head only on said feed-board, sheet-conveyor frames pivotally arranged on the main head to swing upwardly, and sheet-gripping devices operating in said conveyor frames but movable within and carried by said main head when said frames are swung upwardly.

26. In a sheet-feeder, a feed-board, sheet-conveying grippers reciprocatable over said feed-board, and means to simultaneously raise and advance said grippers after having seized the sheet at the beginning of their forward movement.

27. In a sheet-feeder, a feed-board, sheet conveying grippers reciprocatable over said feed-board, means to raise the sheet-conveying grippers to float the sheet over the feed-board in their forward movement and means to lower said conveying grippers before the end of said movement.

28. In a sheet-feeder, a feed-board, sheet conveying grippers reciprocatable over said feed-board, means to raise the sheet-conveying grippers to float the sheet over the feed-board in their forward movement and means to gradually lower said conveying grippers before the end of said movement.

29. In a sheet-feeder, a feed-board, sheet-conveying grippers reciprocatable over said feed-board, means to lower the grippers to seize the sheet, and means thereafter to raise and advance said grippers with the seized sheet to float the latter over the feed-board in their forward movement.

30. In a sheet-feeder, a feed-board, sheet-conveying grippers reciprocatable over said feed-board, means to lower the grippers to seize the sheet at a state of rest in the beginning of a cycle, and means thereafter to raise and advance said grippers with the seized sheet to float the latter over the feed-board in their forward movement.

31. In a sheet-feeder, sheet-conveying devices provided with grippers, means to lower said grippers to seize the sheet at a state of rest and then simultaneously raise and advance the grippers with the seized sheet, and means to actuate said devices at a uniform retarded speed as the sheet ends its forward movement.

32. In a sheet-feeder, sheet-conveying devices provided with grippers, means to lower said grippers to seize the sheet at a state of rest and then simultaneously raise and advance the grippers with the seized sheet, and means to actuate said devices at a uniform retarded speed while lowering same as the sheet ends its forward movement.

33. In a sheet-feeder, front stops, sheet conveying devices provided with grippers lowerable to seize the sheet at a state of rest, and means to actuate said devices first at an accelerated speed and then delivering same at a uniform retarded speed to the front stops.

34. In a sheet-feeder, front stops, sheet conveying devices provided with grippers lowerable to seize the sheet at a state of rest and then raise the leading edge, and means to actuate said devices first at an accelerated speed and then delivering same at a uniform retarded speed to the front stops.

35. In a sheet-feeder, front stops, sheet conveying devices provided with grippers lowerable to seize the sheet at a state of rest and then raise the leading edge, and means to actuate said devices first at an accelerated speed and then delivering same at a uniform retarded speed while lowering same to the front stops.

36. In a sheet-feeder, front stops, sheet-carrying devices provided with outer and inner sets of grippers to seize the sheet, means to raise and move said grippers in unison to carry the sheet to the stops, means to lower said grippers and open the outer set as the sheet reaches said stops while allowing the inner set to slide off the sheet beyond the stops.

37. In a sheet-feeder, front stops, sheet conveying devices provided with two pairs of grippers, one pair adjacent said stops and the other removed therefrom, to seize the sheet at a state of rest and raise same, means to actuate said devices to forward the sheet to the stops, and means to lower said grippers and open the second pair of grippers as the sheet reaches the stops while allowing the first pair to slide off the sheet to hold said sheet against said stops.

38. In a sheet-feeder, front stops, sheet conveying devices provided with two pairs of grippers, one pair adjacent said stops and the other removed therefrom, to seize the sheet at a state of rest and raise same, said grippers holding the sheet under variable pressure, means to actuate said devices to forward the sheet to the stops, and means to lower said grippers and open the second pair of grippers as the sheet reaches the stops while allowing the first pair to slide off the sheet under light pressure to hold said sheet against said stops.

39. In a sheet-feeder, front stops, sheet-conveying devices provided with outer and inner sets of grippers to carry the sheets to the stops, and means to open the outer grippers as the sheet reaches the stops while allowing the inner set to slide off the sheet beyond the stops.

40. In a sheet-feeder, front stops, sheet-conveying devices provided with outer and inner sets of grippers to carry the sheets to the stops, and means to open the outer grippers before the sheet reaches the stops while allowing the inner set to slide off the sheet beyond the stops.

ELMER W. BELLUCHE.